United States Patent Office 2,757,580
Patented Aug. 7, 1956

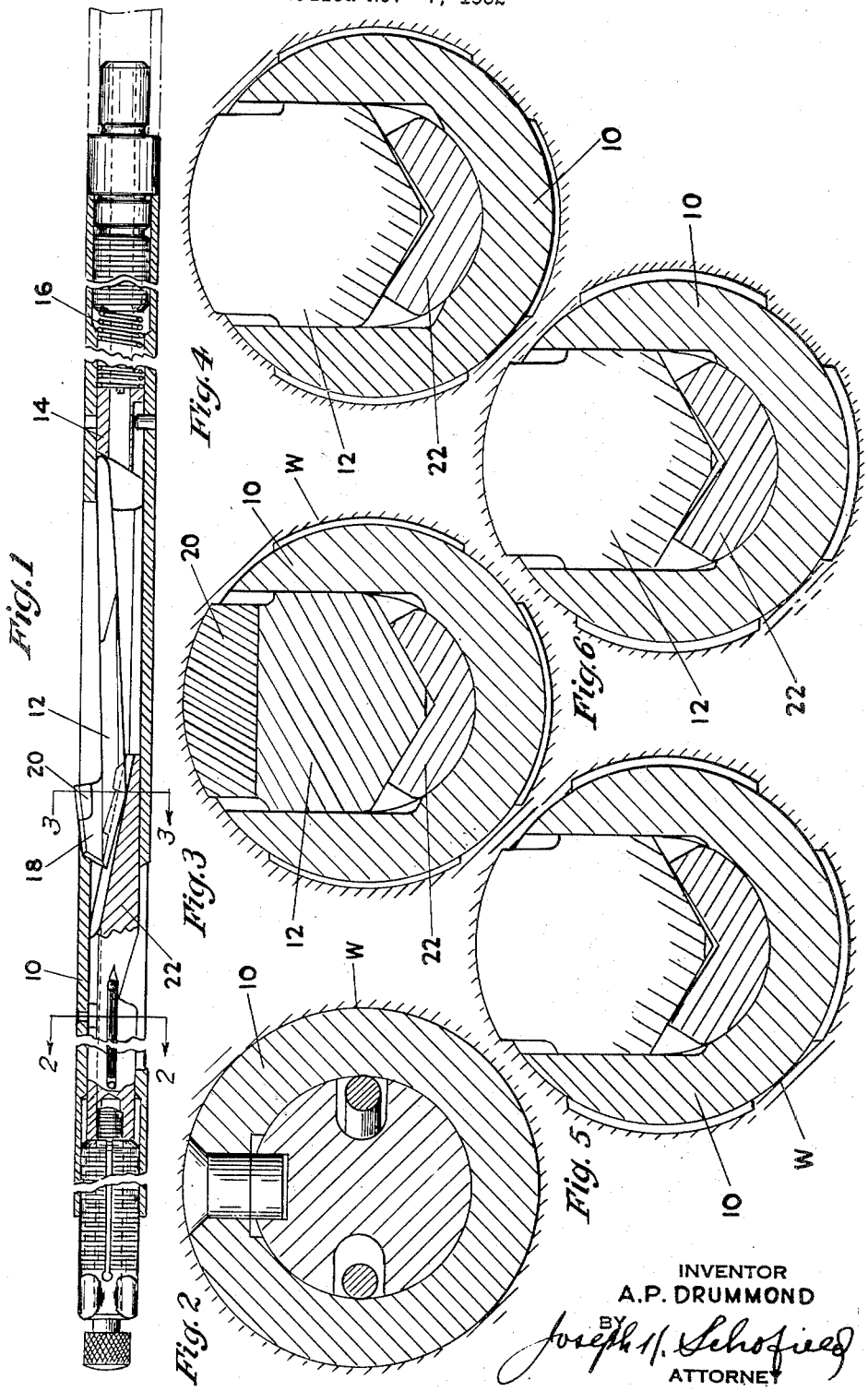

2,757,580

CUTTER HEAD FOR RIFLING MACHINES

Arthur P. Drummond, West Hartford, Conn., assignor, by mesne assignments, to Pratt & Whitney Company, Incorporated, West Hartford, Conn., a corporation of Delaware Application November 7, 1952, Serial No. 319,381

2 Claims. (Cl. 90—28.1)

This invention relates to gun barrel rifling machines and particularly to a cutter head adapted to be reciprocated through the barrel to successively cut the grooves of helical forms therein.

An object of the present invention is to provide a cutter head for a gun barrel rifling machine which will more firmly support the tool or cutter during its successive traverses through the gun barrel bore, particularly when there is a low even number of grooves to be cut in the barrel.

A feature of importance of the invention is that the cutting pressure exerted by the tool against the adjustable wedge used to radially position the tool is distributed obliquely to the surface of the body member rather than to portions of the barrel surfaces diametrically opposite the cutting edges of the tool.

Another feature of importance is that the interengaging surfaces of the cutter and wedge are so formed that the contact between them is concentrated along the sides of the wedge.

With the above and other objects in view, the invention may include the features of construction and operation set forth in the following specification and illustrated in the accompanying drawing.

In the accompanying drawing annexed hereto and forming a part of this specification, I have shown the invention embodied in a cutter head for rifling gun barrels of small or medium caliber, but it will be understood that the invention can be otherwise embodied and that the drawing is not to be construed as defining or limiting the scope of the invention, the claims appended to this specification being relied upon for that purpose.

In the drawing:

Figure 1 is a longitudinal sectional view of a cutter head for a gun bore rifling machine such as is used in rifling barrels of shoulder muskets and other small arms.

Fig. 2 is a transverse sectional view on an enlarged scale taken on the plane of line 2—2 in Fig. 1, and Figs. 3, 4, 5 and 6 are sections taken along the plane of line 3—3 in Fig. 1 on an enlarged scale with the adjustable wedge in successive axially advanced positions.

In the above mentioned drawing there has been shown but one embodiment of the invention which is now deemed preferable, but it is to be understood that changes and modifications may be made within the scope of the appended claims without departing from the spirit of the invention.

Briefly and in its preferred form, the invention may include the following principal parts: First, a sleeve forming the body member of the cutter head having at one end means for attachment to a rifling machine operating rod for reciprocating the cutter head through the bore of a gun; second, a cutter supported at one end for pivotal movement and bearing against a resiliently and axially movable plunger and having a cutting edge adjacent its opposite end; third, a wedge supporting the cutter for successive slight outward movements of its cutting end, the wedge being axially adjustable within the body member for that purpose.

Referring more in detail to the figures of the drawing, there is provided an elongated sleeve 10 having lateral openings therein at intermediate portions and housing a rifling tool or cutter 12 midway of its length. At one end of this cutting tool 12 is a supporting member 14 in the form of a short plunger resiliently forced in one direction by a spring 16, there being an oblique front face on the plunger 14 for engagement against a corresponding bevelled end face of the cutting tool 12. By this means of supporting the forward end of the cutter 12 slight adjustments outward of the cutting end 18 may be made for successive depths of cuts. At the opposite end of the cutter are cutting surfaces formed in an inserted member of extremely hard substance 20 such as tungsten carbide. The width of the cutting surfaces on the inserted member 20 is equal to the width of the groove to be cut in the gun bore. To rigidly support this cutting tool 12 directly below its cutting surfaces 20 in a manner to permit slight radial outward movements of the cutting surfaces to successively cut the grooves in the barrel is a wedge shaped member 22 axially movable predetermined small amounts within the sleeve 10 and having its upper oblique surfaces directly contacting the oblique lower surfaces formed at the cutting end of the rifling tool 12.

It will be seen from the above that by adjusting the screw 24 at the far end of the sleeve 10, the inner end of which bears against the outer end of the wedge member, the cutting tool 12 may be advanced radially outward slight amounts by successive slight longitudinal or axial movements of the wedge 22.

In rifling bores of guns having an even and small number of flutes, the barrel surface W directly opposite the surfaces being cut is recessed to form a diametrically opposite groove. The cutting pressure exerted by the rifling tool 12 after the first cuts, as indicated in Figs. 3 to 6, will be directed toward this partially formed groove where the sleeve 10 can obtain no support. For the purpose of improving the rigidity of the support for the cutter 12 the wedge 22 is formed as indicated in Figs. 4, 5 and 6 so that cutting pressure of the rifling tool 12 is directed obliquely toward the surface of the sleeve 10 by the form of the wedge surfaces engaging the under surfaces of the cutting tool 12.

It will be seen from an inspection of Figs. 3 to 6 that the angular surfaces on the upper side of the wedge 22 are at a slightly different and less oblique angle to the angular wedge shaped surfaces on the lower side of the cutting tool 12. The pressure therefore of the cutting tool 12 is exerted directly toward the lateral portions of the groove cut in the back face of the tool 12 and through the tool to the lateral portions of the upper surfaces of the wedge 22 to the outer cylindrical surface of the wedge. The outer surface of the wedge as shown is cylindrical and is directly in contact with the internal cylindrical surface of the sleeve 10. The effect, therefore, will be that the cutting pressures of the tool 12 are directed by the form of the wedge surfaces of the tool and the contacting surfaces of the wedge member obliquely toward the lands of the gun bore being rifled. At all times during the cutting operation the cutting surfaces are supported in position directly from the lands of the bore between the previously formed portions of the rifling grooves.

I claim as my invention:

1. A cutter head for a rifling machine for cutting an even and small number of grooves in a gun bore of small caliber, comprising a sleeve, a rifling tool mounted therein for radial movement of its cutting end, a wedge member axially adjustable to displace the cutting end of the tool successively to different radial positions, said wedge member having a partial cylindrical outer surface and a V-shaped upper surface substantially engaging the under surfaces of the cutting tool on lateral portions of said V-shaped surface, whereby the cutting pressure of the tool will be directed toward the lands adjacent the groove which is diametrically opposite from the groove being cut.

2. A cutter head for a rifling machine for cutting an even and small number of grooves in a gun bore of small caliber, comprising a sleeve, a rifling tool mounted therein for radial movement of its cutting end, a wedge member axially adjustable to displace the cutting end of the tool successively to different radial positions, said wedge having V-shaped upper surfaces substantially engaging the under wedge-shaped surfaces of the cutting tool on lateral portions thereof, whereby the cutting pressure of the tool will be transmitted obliquely from the tool and obliquely from the wedge toward the lands adjacent the groove diametrically opposite from the cutting end.

References Cited in the file of this patent

UNITED STATES PATENTS

| | | |
|---|---|---|
| 997,568 | Lindgreen | July 11, 1911 |
| 1,239,659 | Andrews | Sept. 11, 1917 |
| 1,324,289 | Andrews | Dec. 9, 1919 |
| 2,368,051 | Pope et al. | Feb. 8, 1921 |
| 2,415,300 | Lovely | Feb. 4, 1947 |
| 2,550,949 | Weidner | May 1, 1951 |